United States Patent
Yang

(10) Patent No.: US 11,016,532 B2
(45) Date of Patent: May 25, 2021

(54) DISPLAY DEVICE AND MOVING METHOD THEREOF

(71) Applicant: Samsung Display Co., Ltd., Yongin-si (KR)

(72) Inventor: Jeong Do Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/354,832

(22) Filed: Mar. 15, 2019

(65) Prior Publication Data

US 2020/0033913 A1    Jan. 30, 2020

(30) Foreign Application Priority Data

Jul. 30, 2018    (KR) .................... 10-2018-0088651

(51) Int. Cl.
     *G06F 1/16*      (2006.01)
     *H04M 1/02*      (2006.01)

(52) U.S. Cl.
     CPC .......... *G06F 1/1624* (2013.01); *G06F 1/1616* (2013.01); *H04M 1/0268* (2013.01)

(58) Field of Classification Search
     CPC .... G06F 1/1624; G06F 1/1616; G06F 1/1652; H04M 1/0268; H04M 1/0237; G09F 9/301
     USPC ...................................................... 455/575.4
     See application file for complete search history.

(56) References Cited

U.S. PATENT DOCUMENTS

| | | | |
|---|---|---|---|
| 8,224,407 B2 * | 7/2012 | Madsen | H04M 1/0239 455/566 |
| 2006/0176243 A1 * | 8/2006 | Yeh | G06F 1/1624 345/30 |
| 2013/0058063 A1 | 3/2013 | O'Brien | |
| 2017/0023978 A1 * | 1/2017 | Cho | H04M 1/0268 |
| 2017/0064847 A1 * | 3/2017 | Lim | G09F 9/00 |

FOREIGN PATENT DOCUMENTS

| | | |
|---|---|---|
| KR | 10-2011-0082943 A | 7/2011 |
| KR | 10-2014-0059274 A | 5/2014 |
| KR | 10-2014-0066064 A | 5/2014 |
| KR | 10-2017-0081559 A | 7/2017 |
| KR | 10-2018-0005774 A | 1/2018 |

* cited by examiner

*Primary Examiner* — Eugene Yun
(74) *Attorney, Agent, or Firm* — Lewis Roca Rothgerber Christie LLP

(57) ABSTRACT

A display device includes: a first roller; a second roller; a gear unit that is coupled to the second roller and configured to rotate with the second roller; a rail unit that is engaged with the gear unit; a housing where the rail unit is provided; and a display panel module of which one end is fixed to the housing and the other end is fixed to the second roller and is configured to be bent by the first roller and then rolled on the second roller, wherein the display panel module is configured to be slide-extended and slide-retracted as the gear unit and the rail unit operate while being engaged with each other.

20 Claims, 12 Drawing Sheets

D2 ← → D1

DISPLAY DEVICE AND MOVING METHOD THEREOF

CROSS-REFERENCE TO RELATED APPLICATION

This application claims priority to and the benefit of Korean Patent Application No. 10-2018-0088651 filed in the Korean Intellectual Property Office on Jul. 30, 2018, the entire contents of which are incorporated herein by reference.

BACKGROUND

Field

Aspects of some example embodiments of the present invention relate to a display device and a driving method thereof.

Description of the Related Art

Recently, next-generation display devices including flexible display panels have been researched and developed. A flexible display panel is deformable like paper, and accordingly, may be used for various purposes. For example, flexible display panels may be used in portable devices such as tablet PCs, mobile phones, and the like.

Users want to view an image in a large screen while preferring a small-sized portable device. In order to satisfy portability and a large screen, a display device having a flexible display panel that can be folded or expanded may be utilized according to some embodiments.

The above information disclosed in this Background section is only for enhancement of understanding of the background of the invention and therefore it may contain information that does not constitute prior art.

SUMMARY

Aspects of some example embodiments of the present invention relate to a display device and a driving method thereof. For example, some example embodiments of the present invention relate to a display device including a flexible display panel, and a moving method thereof.

In a display device having an expandable flexible display panel, the flexible display panel may be slide-extended from a housing or slide-retracted into the housing. When the flexible display panel is slide-extended from the housing, wrinkles or buckles of the flexible display panel are hardly generated by tension of a user. However, when the user applies force in a slide-retract direction such that the flexible display panel is slide-retracted into the housing, the flexible display panel may be wrinkled or buckled. In order to prevent or reduce instances of the flexible display panel being wrinkled or buckled, a spring-rod type of tensioner and the like may be used to pull the flexible display panel in the slide-retract direction.

When the spring-rod type tensioner is used for a long period of time, tension may be weakened, and slide-retraction of the flexible display panel may not be normally carried out due to weakened tension. In addition, because a relatively thick metal spring may be used to assure tension, the spring-rod type of tensioner may cause an increase not only of the weight of the display device but also the volume of the display device, thereby potentially deteriorating portability of the display device.

Aspects of some example embodiments of the present invention have been made in an effort to provide a display device having an expandable flexible display panel that can assure tension in a slide-retract direction without using an additional tensioner that pulls the flexible display panel in the slide-retract direction, and a moving method thereof.

A display device according to some example embodiments of the present invention includes: a first roller; a second roller; a gear unit that is coupled to the second roller and thus rotates with the second roller; a rail unit that is engaged with the gear unit; a housing where the rail unit is provided; and a display panel module of which one end is fixed to the housing and the other end is fixed to the second roller and thus is bent by the first roller and then rolled on the second roller, wherein the display panel module is slide-extended and slide-retracted as the gear unit and the rail unit operate while being engaged with each other.

The display panel module may include a support film and a display panel that is adhered on the support film and includes a plurality of pixels.

Tension applied to the support film while the display panel module is in a slide-extended state may be higher than tension applied to the support while the display panel module is in a slide-retracted state.

A portion of the display panel, exposed to the outside while the display panel module is in a slide-retracted state, may be supported by the housing.

Some of the display panel, not supported by the housing while the display panel module is in a slide-extended state, may be supported by increased tension of the support film.

The rail unit and the gear unit may be engaged with each other as a rack and pinion type.

The rail unit and the gear unit may be engaged with each other as a chain and sprocket type.

The rail unit may be formed integrally with the housing.

The gear unit may include: a first gear that is coupled to the second roller; a second gear that is engaged with the rail unit; and a third gear that is engaged with the first gear and the second gear.

The display device may further include a driver that provides a rotation force for rotating the second roller around a rotation axis.

A display device according to some example embodiments of the present invention includes: a first housing; a second housing; and a display panel module that is attached on the second housing, wherein the first housing and the second housing are slide-engaged such that the display panel module is slide-extended in a slide-extension direction and slide-retracted in a slide-retract direction, the first housing includes a roller that rolls the display panel module and a gear unit that is coupled to the roller and thus rotates together with the roller, and the second housing includes a rail unit that is engaged with the gear unit.

When the second housing moves in the slide-retract direction, the gear unit and the rail unit operate by being engaged with each other, and thus the display panel module may be rolled on the roller by a force that moves the second housing.

When the second housing moves in the slide-extension direction, the gear unit and the rail unit operate by being engaged with each other, and thus the display panel module may be unrolled from the roller by a force that moves the second housing.

The display device may further include a driver that provides a rotation force to rotate the roller around a rotation axis, wherein the second housing moves in the slide-extension direction and the slide-retract direction by rotation of the roller.

Tension applied to the display panel module while the display panel module is in a slide-extended state may be higher than tension applied to the display panel module while the display panel module is in a slide-retracted state.

According to some example embodiments of the present invention, a method for moving a display device that includes a first housing and a second housing which are slide-engaged with each other is provided. The method for moving the display device includes: moving the second housing in a slide-extension direction for a display panel module attached on the second housing to be slide-extended from the first housing; rotating a gear unit in one direction and unrolling the display panel module rolled on a roller that is connected with the gear unit from the roller as the gear unit included in the first housing and a rail unit included in the second housing are engaged with each other; and increasing tension applied to the display panel module as a radius of the display panel module rolled on the roller is reduced.

The moving method of the display device may further include: moving the second housing in a slide-retract direction for the display panel module to be slide-retracted into the first housing; rotating the gear unit in the opposite direction and rolling the display panel module on the roller as the gear unit included in the first housing and the rail unit included in the second housing are engaged with each other; and releasing tension of the display panel module.

A portion of the display panel module, exposed to the outside while the display panel module is in a slide-retracted state, may be supported by the second housing.

According to some example embodiments of the present invention, a moving method of a display device that includes a first housing and a second housing that are slide-engaged with each other is provided. The moving method of the display device includes: rotating a gear unit included in the first housing in one direction by a driver; moving the second housing in a slide-extension direction to slide-expand a display panel module attached on the second housing from the first housing as a rail unit included in the second housing is engaged with the gear unit; unrolling the display panel module rolled on a roller that is connected with the gear unit; and increasing tension applied to the display panel module as a radius of the display panel module rolled on the roller is reduced.

The moving method of the display device display device may further include: by the driver, rotating the gear unit in the opposite direction; moving the second housing in a slide-retract direction for the display panel module to be slide-retracted into the first housing as the gear unit and the rail unit are engaged with each other; and rolling the display panel module on the roller.

The display device having the expandable flexible display panel may assure tension in the slide-retract direction without using an additional tensioner that pulls the flexible display panel in the slide-retract direction.

DETAILED DESCRIPTION

Figure 1:
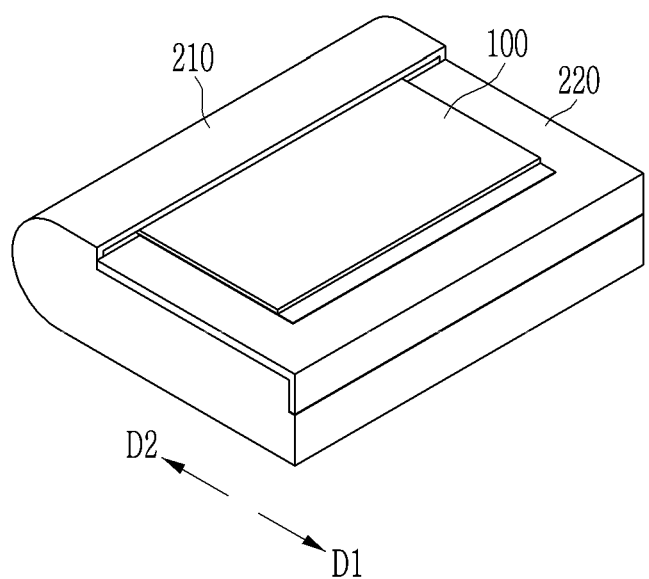
FIG. 1 shows a state that an expandable display device is in a slide-retracted state according to some example embodiments of the present invention.

Aspects of some example embodiments of the present invention will be described more fully hereinafter with reference to the accompanying drawings, in which example embodiments of the invention are shown. As those skilled in the art would realize, the described embodiments may be modified in various different ways, all without departing from the spirit or scope of the present invention.

Further, in the example embodiments, because like reference numerals designate like elements having the same configuration, a first example embodiment is representatively described, and in other example embodiments, only different configurations from the first example embodiment will be described for brevity and to avoid repetitive descriptions.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, a display device according to some example embodiments of the present invention will be described with reference to FIGS. 1-6.

Figure 2:
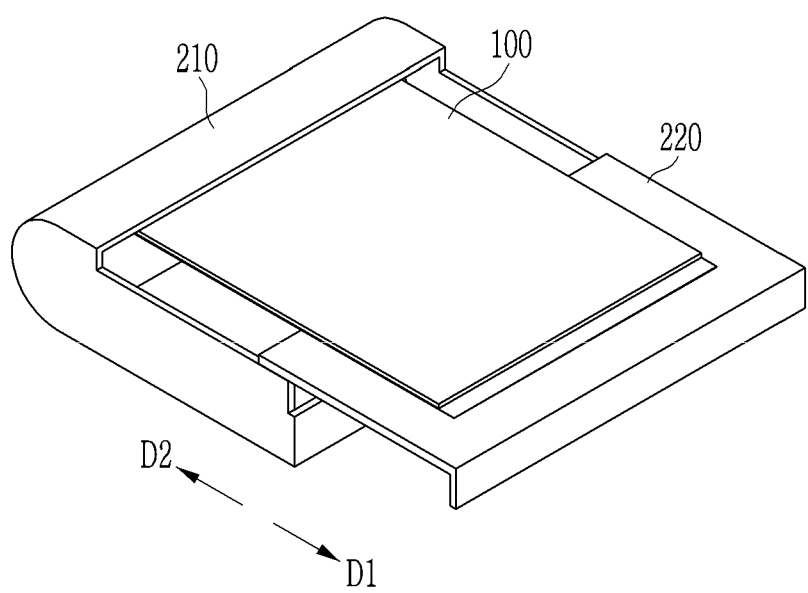
FIG. 2 shows a state that the expandable display device is in a slide-extended state according to some example embodiments of the present invention.
Figure 3:
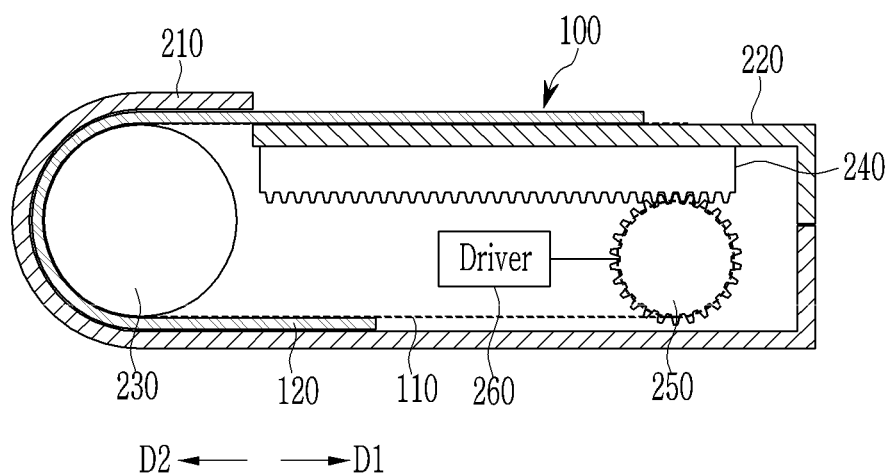
FIG. 3 and FIG. 4 are cross-sectional views of an internal structure of the expandable display device according to some example embodiments of the present invention.
Figure 4:
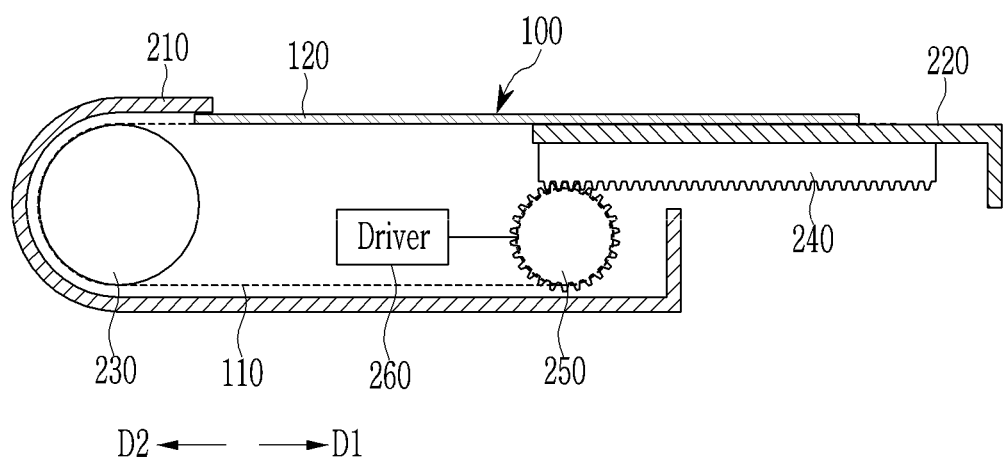
Figure 5:
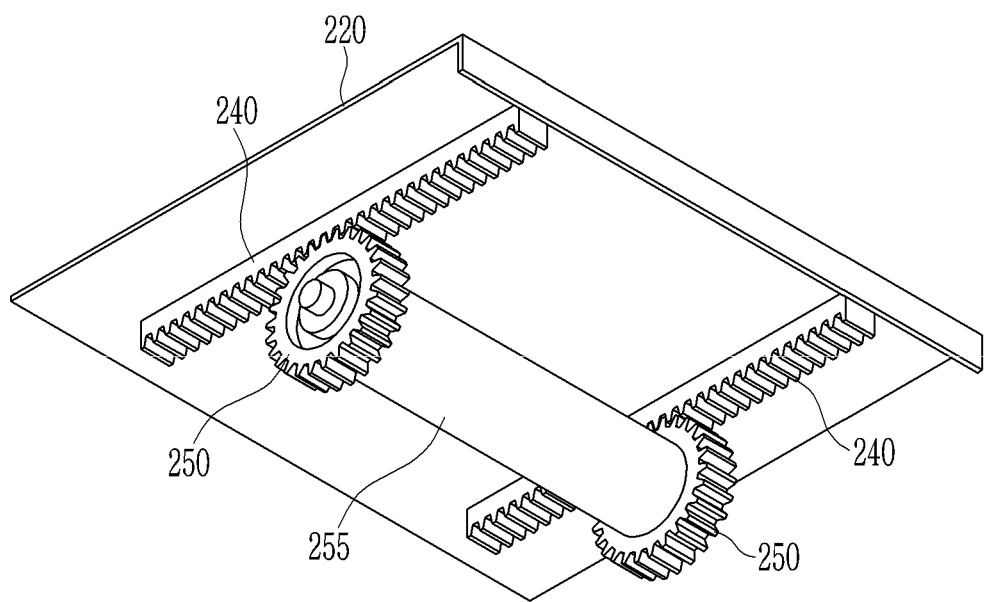
FIG. 5 shows that a rail unit in a second housing and a gear unit coupled to a second roller according to some example embodiments of the present invention.
Figure 6:
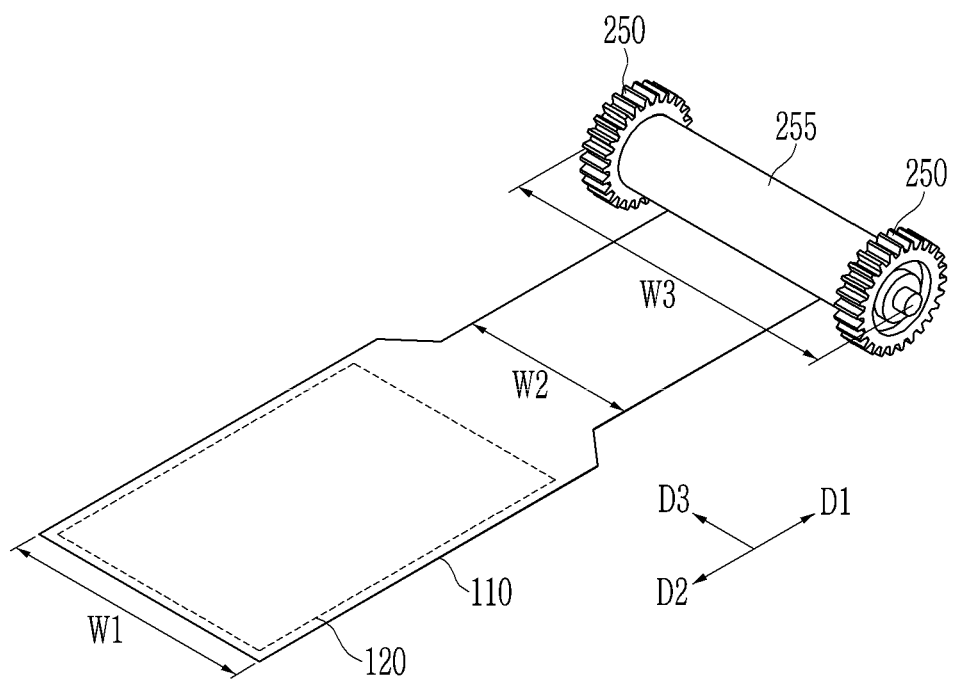
FIG. 6 shows a connection structure of the second roller and the display panel module according to some example embodiments of the present invention.

FIG. 1 shows a state that an expandable display device is in a slide-retracted state according to some example embodiments of the present invention. FIG. 2 shows a state that the expandable display device is in a slide-extended state according to some example embodiments of the present invention. FIG. 3 and FIG. 4 are cross-sectional views of an internal structure of the expandable display device according to some example embodiments of the present invention. FIG. 5 shows that a rail unit in a second housing and a gear unit coupled to a second roller according to some example embodiments of the present invention that are engaged with each other. FIG. 6 shows a connection structure of the second roller and the display panel module according to some example embodiments of the present invention.

As shown in FIG. 1 and FIG. 2, a display device includes a first housing 210, a second housing 220, and a display panel module 100.

The display panel module 100 is attached on the second housing 220. The first housing 210 and the second housing 220 are slide-engaged such that the display panel module 100 is slide-expanded from the first housing 210 and the display panel module 100 is slid back into the first housing 210. Hereinafter, when the display device is viewed from the outside, a direction in which the display panel module 100 is slide-expanded from the first housing 210 is called a slide-extension direction D1, and a direction in which the display panel module 100 is slid back into the first housing 210 is called a slide-retract direction D2. The slide-extension direction D1 and the slide-retract direction D2 may be opposite to each other.

When the second housing 220 moves in the slide-extension direction D1 by a user or a driver (refer to reference numeral 260 in FIG. 3 and FIG. 4) while the display panel module 100 is slid back into the first housing 210 (i.e., the state shown in FIG. 1), the display panel module 100 is slide-extended from the first housing 210 (a state shown in FIG. 2). When the display panel module 100 is in the slide-extended state, an image can be displayed on a large-sized screen from the front of the display device.

In addition, when the second housing 220 moves in the slide-retract direction D2 by the user or the driver 260 after the display panel module 100 is slide-extended from the first housing 210, the display panel module 100 is slid back into the first housing 210. An image is displayed on a relatively small-sized screen from the front of the display device when the display panel module 100 is in the slide-retracted state. In this case, one side of the first housing 210, which corresponds to a rear side of the display device, may be made transparent, and thus the image can also be displayed on the rear side of the display device.

As shown in FIG. 3 to FIG. 5, according to some example embodiments, the first housing 210 may include a first roller 230, a second roller 255, a gear unit 250, and the driver 260. The second housing 220 may include a rail unit 240.

The first roller 230 is perpendicular to the slide-extension direction D1 or the slide-retract direction D2, and rotates about a rotation axis in a direction that is parallel with a display surface of the display panel module 100. The display surface of the display panel module 100 implies an area where an image is displayed. The first roller 230 rolls the display panel module 100 to bend the display panel module 100 in a direction of about 180 degrees, and thus a movement direction of the display panel module 100 can be changed in the first housing 210 when the display panel module 100 is slide-retracted and slide-extended. For example, when the display panel module 100 is slide-retracted, the display panel module 100 on the second housing 220 moves in the slide-retract direction D1, and in the first housing 210, the display panel module 100 moves in the slide-extension direction in the first housing 210 by the first roller 230. In addition, when the display panel module 100 is slide-extended, the display panel module 100 on the second housing 220 moves in the slide-extension direction D1, and in the first housing 210, the display panel module 100 moves in the slide-retract direction D2 by the first roller 230.

A radius of the first roller 230 may correspond to a minimum allowable radius for bending of the display panel module 100 with respect to elements included in the display panel module 100. For example, the radius of the first roller 230 may be about 3 mm to 4 mm. The first roller 230 may include at least one of plastic, metal, glass, rubber, and silicon.

The second roller 255 is located at the opposite side of the first roller 230 in the first housing 210, and rotates about a rotation axis that is perpendicular to the slide-extension direction D1 or the slide-retract direction D2 and parallel with the display surface of the display panel module 100. The second roller 255 may include at least one of plastic, metal, glass, rubber, or silicon. The gear units 250 are engaged to opposite ends of second roller 255 and thus rotate together with the second roller 255.

The gear units 250 are engaged with the rail units 240 located below the second housing 220. The rail units 240 may be provided corresponding to the gear units 250 below the second housing 220. Each of two rail units 240 may extend in a direction that is parallel with the slide-extension direction D1 or the slide-retract direction D2. The rail unit 240 may be a rack, and the gear unit 250 may be engaged with the rail unit 240 as a pinion. That is, the rail unit 240 and the gear unit 250 may operate by being engaged as a rack and pinion type.

The driver 260 provides a rotation force that drives the second roller 255 to rotate in a clockwise direction and a counterclockwise direction with reference to the rotation axis. That is, the driver 260 rotates the gear units 250 in the clockwise direction and the counterclockwise direction with reference to the rotation axis. The driver 260 may include a micro-motor that provides a rotation force to the second roller 255. According to some example embodiments, the driver 260 can be omitted.

The display panel module 100 includes a support film 110, and a display panel 120 that is bonded on the support film 110.

One end of the support film 110 is fixed to the second housing 220, a center portion of the support film 110 contacts the first roller 230 and thus is bent, and the other end of the support film 110 is fixed to the second roller 255. When the display panel module 100 is slide-retracted, the support film 110 moves to the second roller 255 through the first roller 230, and thus a part of the support film 110 is wound on the second roller 255. When the display panel module 100 is slide-extended, the support film 110 moves to the outside the first housing 210 from the second roller 255 through the first roller 230, and then the part of the support film 110 that is wound on the second roller 255 is unwound from the second roller 255. That is, the support film 110 is wound around the second roller 255, and the display panel 120 may not be wound around the second roller 255. Because the display panel 120 is not wound around the second roller 255, a radius of the second roller 255 may be smaller than that of the first roller 230. The support film 110 may be made of a flexible material that can withstand tension in the slide-extension direction D1 and the slide-retract direction D2. For example, the support film 110 may include at least one of plastic, metal, rubber, and silicon. The support film 110 may include a plurality of layers formed of at least one of plastic, metal, rubber, and silicon. For example, the support film 110 may include a plurality of layers made of metal. Alternatively, the support film 110 may include one layer made of one of plastic, metal, rubber, and silicon and another layer made of another material.

The display panel 120 may be a flexible display panel including a plurality of pixels formed on a flexible base substrate. The base substrate may include flexible plastic, metal, glass, and the like. The display panel 120 may include a touch sensor, an optical film, a protective window, and the like. The display panel 120 may be adhered on the support film 110 by an adhesive.

When the gear units 250 rotate in one direction (e.g., the clockwise direction in FIG. 3) with reference to the rotation axis, the second housing 220 moves in the slide-extension direction D1, and as the second housing 220 moves, the display panel module 100 is slide-expanded. In this case, the support film 110 wound around the second roller 255 is unwound. As the support film 110 wound around the second roller 255 is unwound, the radius of the support film 110 rolled on the second roller 255 is reduced such that tension applied to the supplied film 110 is increased. Accordingly, the support film 110 can support the display panel 120 with high tension while the display panel module 100 is slide-expanded. That is, although an additional support body is not provided in a part of the display panel 120, which is not supported by the second housing 220 while the display panel module 100 is in the slide-extended state, the display panel 120 can be supported by the support film 110 having high tension.

When the gear units 250 rotate in the opposite direction (e.g., the counterclockwise direction in FIG. 4) with reference to the rotation axis by the driver 260, the second housing 220 moves in the slide-retract direction D2, and as the second housing 220 moves, the display panel module 100 may be slide-retracted. In this case, the second roller 255 rolls the support film 110 while rotating around the rotation axis. Because tension is applied to the display panel module 100 while the support film 110 rolled around the second roller 255, the display panel module 100 may be prevented from being wrinkled or buckled. Although the tension of the support film 110 is released while the display panel module 100 is in the slide-retracted stated, a portion of the display panel 120, exposed to the outside, can be supported by the second housing 220.

As described, tension applied to the support film 110 while the display panel module 100 is in the slide-extended state is higher than tension applied to the support film 110 while the display panel module 100 is in the slide-retracted state.

Meanwhile, when the driver 260 is omitted, the user may pull the second housing 220 in the slide-extension direction D1 to expand the display panel module 100. The second roller 255 rotates as the second housing 220 moves, and thus the support film 110 wound around the second roller 255 is unwound. In such a case, as described above, the support film 110 can support the display panel 120 with high tension while the display panel module 100 is in the slide-extended state.

In addition, when the driver 260 is omitted in the display device, the user may push the second housing 220 along the slide-retract direction D2 such that the display panel module 100 can be slide-retracted. As the second housing 220 moves, the second roller 255 rotates and thus the second roller 255 rolls the support film 110. As the support film 110 is rolled on the second roller 255, tension can be applied to the display panel module 100.

As described above, as the rail units 240 provided in the second housing 220 and the gear units 250 coupled to the second roller 255 operate together while being engaged with each other, a force that moves the second housing 220 may be changed to tension that pulls the display panel module 100 in the slide-extension direction D1 or tension that pulls the display panel module 100 in the slide-retract direction D2. That is, no additional tensioner to pull the display panel module 100 in the slide-retract direction is needed, as the rail unit 240 provided in the second housing 220 and the gear unit 250 coupled to the second roller 255 operate by being engaged with each other.

As shown in FIG. 6, the support film 110 includes a relatively wide first width W1 and a relatively narrow second width W2. The first width W1 and the second width W2 may be widths of the support film 110 in an axis direction D3. The axis direction D3 may be perpendicular to the slide-extension direction D1 and the slide-retract direction D2 in a direction that is parallel with the rotation axis of the first roller 230 or the second roller 255. A portion having the first width W1 includes one end of the support film 110, and a portion having the second width W2 includes the other end of the support film 110, fixed to the second housing 220. The display panel 120 may be bonded to the portion having the first width W1. A width of the display panel 120 in the axis direction D3 may be equal to or smaller than the first width W1.

In this case, a third width W3 in the axis direction D3 of the second roller 255 and the gear units 250 may be equal to or smaller than the first width W1. Accordingly, the width of the display device in the axis direction D3 does not increase by the second roller 255 and the gear units 250.

A width of the second roller 255 in the third direction D3 may be equal to or greater than the second width W2. The portion of the support film 110 having the second width W2 is wound around the second roller 255, and the portion of the support film 110 having the first width W1 is not wound around the second roller 255.

Meanwhile, a gap between the two rail units 240 shown in FIG. 5 may be equal to a gap between the two gear units 240 shown in FIG. 6. That is, the gap between the two rail units 240 may be equal to or greater than the second width W2.

Hereinafter, referring to FIG. 7, a display device according to some example embodiments of the present invention will be described. Differences from the above-described FIG. 1 to FIG. 6 will be mainly described.

Figure 7:
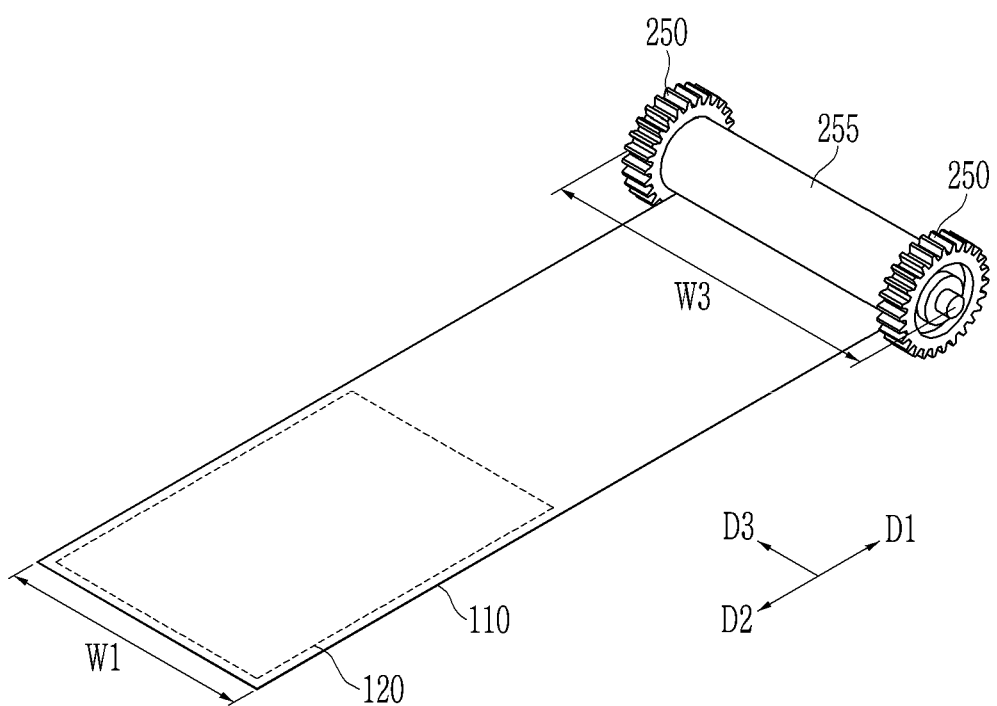
FIG. 7 shows a connection structure between a second roller and a display panel module according to some example embodiments of the present invention.

FIG. 7 shows a connection structure between a second roller and a display panel module according to some example embodiments of the present invention.

Referring to FIG. 7, a support film 110 wholly has a first width W1 in an axis direction D3. The display panel 120 may be adhered adjacent to one end of the support film 110, which is fixed to a second housing 220.

A third width W3 of a second roller 255 and gear units 250 in the axis direction D3 may be greater than the first width W1. A width of the second roller 255 in the axis direction D3 may be equal to or greater than the first width W1.

The gap between the two rail units 240 shown in FIG. 5 may be equal to a gap between the two gear units 250 of FIG. 7. That is, the gap between the two rail units 240 may be equal to or greater than the first width W1.

Excluding the differences, features of some example embodiments of the present invention described with reference to FIG. 1 to FIG. 6 can all be applied to some example embodiments of the present invention described with reference to FIG. 7, and therefore, some repeated description will be omitted.

Hereinafter, a display device according to some example embodiments of the present invention will be described with reference to FIG. 8 and FIG. 9. Differences from the above-described FIG. 1 to FIG. 6 will be mainly described.

Figure 8:
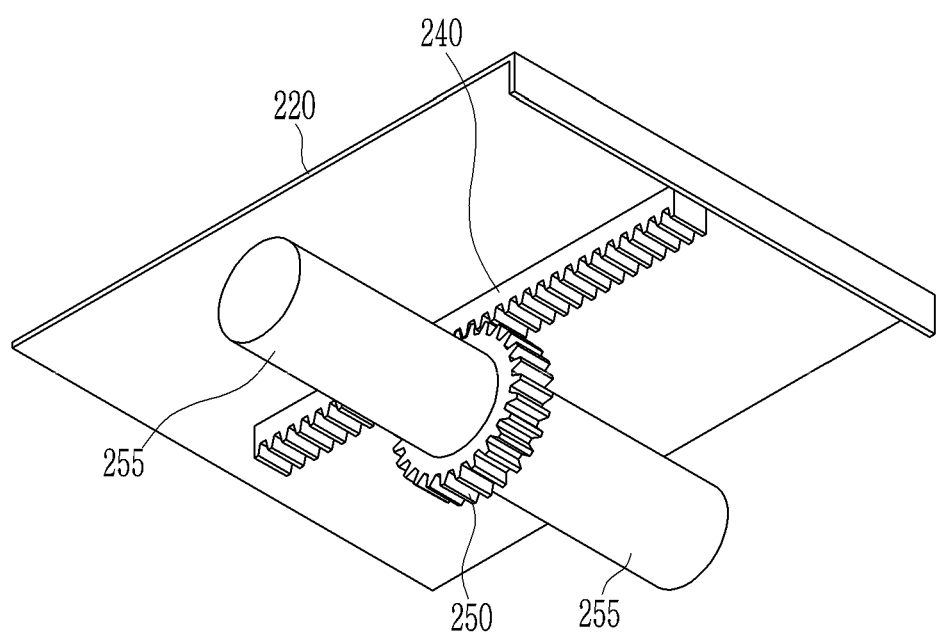
FIG. 8 shows engagement of a rail unit provided in a second housing and a gear unit coupled to a second roller according to some example embodiments of the present invention.

FIG. 8 shows engagement of a rail unit provided in a second housing and a gear unit coupled to a second roller according to some example embodiments of the present invention. FIG. 9 shows a connection structure of the second roller and a display panel module according to some example embodiments of the present invention.

Figure 9:
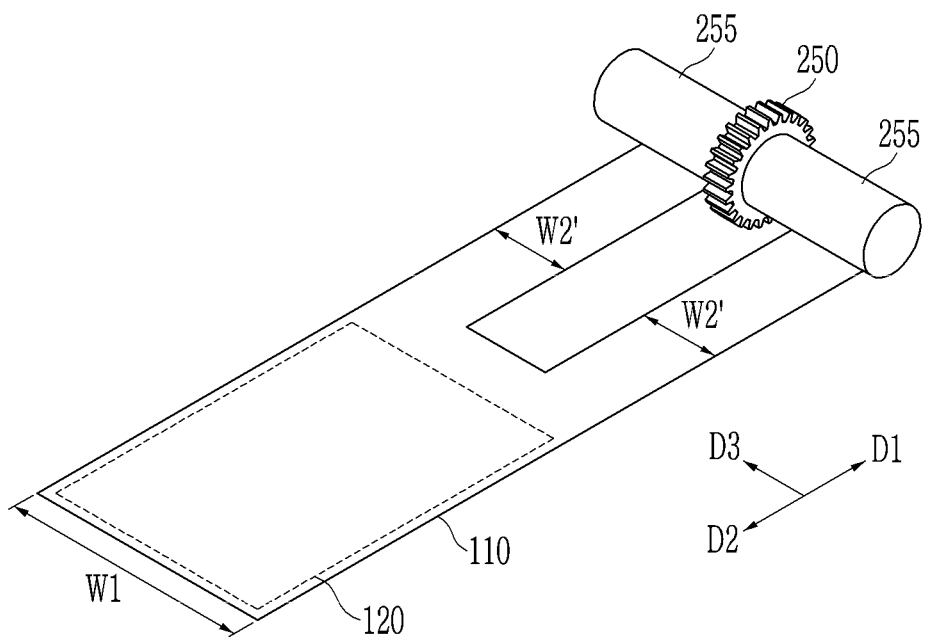
FIG. 9 shows a connection structure of the second roller and a display panel module according to some example embodiments of the present invention.

Referring to FIG. 8 and FIG. 9, one rail 240 may be provided below a second housing 220. The rail unit 240 may extend in a direction that is parallel with a slide-extension direction D1 or a slide-retract direction D2 at a lower center of the second housing 220.

One rail unit 240 is engaged with one gear unit 250. Second rollers 255 are coupled to opposite sides of the gear unit 250 and thus rotate together with the rail unit 240.

A support film 110 includes a portion having a relatively wide width W1 and two portions, each having a relatively narrow width W2'. Each of the two portions of the support film 110, having the second width W2', may include a side that corresponds to an extension line of a side having the first width W1, extended in the slide-extension direction D1 or slide-retract direction D2. The two portions of the support film 110, each having the second width W2', are fixed to the second rollers 255 at opposite sides of the gear unit 250. A portion of the support film 110, which corresponds to the gear unit 250, is cut and thus two portions, each having the second width W2', are formed. A width of each of the two rollers 255 in the axis direction D3 may be equal to or greater than the second width W2'. A width of the portion cut corresponding to the gear unit 250 in the axis direction D3 may be equal to or greater than a width of the gear unit 250.

Excluding the differences, features of some example embodiments of the present invention described with reference to FIG. 1 to FIG. 6 can all be applied to some example embodiments of the present invention described with reference to FIG. 8 and FIG. 9, and therefore, some repetitive description will be omitted.

Hereinafter, a display device according to some example embodiments of the present invention will be described with reference to FIG. 10. Differences from the above-described FIG. 1 to FIG. 6 will be mainly described.

Figure 10:
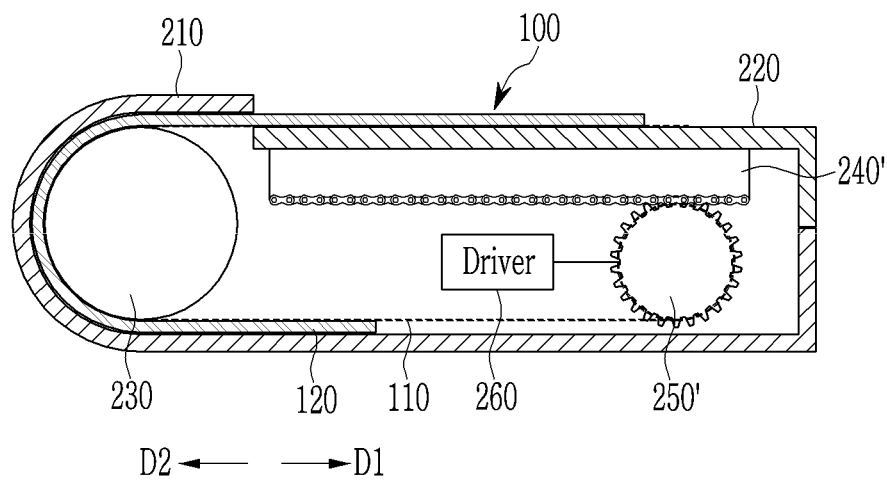
FIG. 10 is a cross-sectional view of an internal structure of an expandable display device according to some example embodiments of the present invention.

FIG. 10 is a cross-sectional view of an internal structure of an expandable display device according to some example embodiments of the present invention.

Referring to FIG. 10, a rail unit 240' included in a second housing 220 is a chain, and a gear unit 250' included in a first housing 210 may be engaged with the rail unit 240' as a sprocket. That is, the rail unit 240' and the gear unit 250' may operate by being engaged with each other as a chain and sprocket type.

Excluding the differences, features of some example embodiments of the present invention described with reference to FIG. 1 to FIG. 6 can all be applied to some example embodiments of the present invention described with reference to FIG. 10, and therefore, some repetitive description will be omitted.

The chain and sprocket type of rail unit 240' and gear unit 250' may have the same size as described with reference to FIG. 6 or the same size as described with reference to FIG. 7. Alternatively, as described above with reference to FIG. 8 and FIG. 9, one rail unit 240' and one gear unit 250' may be provided.

Hereinafter, a display device according to some example embodiments of the present invention will be described with reference to FIG. 11. Differences from the above-described FIG. 1 to FIG. 6 will be mainly described.

Figure 11:
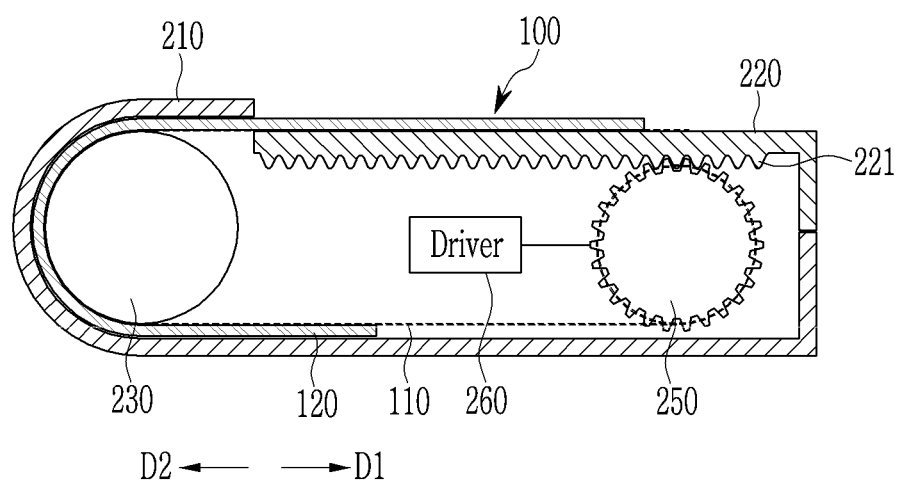
FIG. 11 is a cross-sectional view of an internal structure of an expandable display device according to some example embodiments of the present invention.

FIG. 11 is a cross-sectional view of an internal structure of an expandable display device according to some example embodiments of the present invention.

Referring to FIG. 11, instead of a rail unit 240, a rack shape 221 may be formed in a bottom side of a second housing 220. That is, the rail unit 240 may be integrally formed to the second housing 220. The rack shape 221 formed in the bottom side of the second housing 220 is formed corresponding to a gear unit 250 and is thus engaged with the gear unit 250. The rack shape 221 may extend in a direction that is parallel with a slide-extension direction D1 or a slide-retract direction D2.

Excluding the differences, features of some example embodiments of the present invention described with reference to FIG. 1 to FIG. 6 can all be applied to some example embodiments of the present invention described with reference to FIG. 11, and therefore, some repetitive description will be omitted.

Meanwhile, the rack shape 221 and the gear unit 250 may have the same size as described with reference to FIG. 6 or the same size as described with reference to FIG. 7. Alternatively, as described above with reference to FIG. 8 and FIG. 9, one rack shape 221 and one gear unit 250 may be provided.

Hereinafter, a display device according to some example embodiments of the present invention will be described with reference to FIG. 12. Differences from the above-described FIG. 1 to FIG. 6 will be mainly described.

Figure 12:
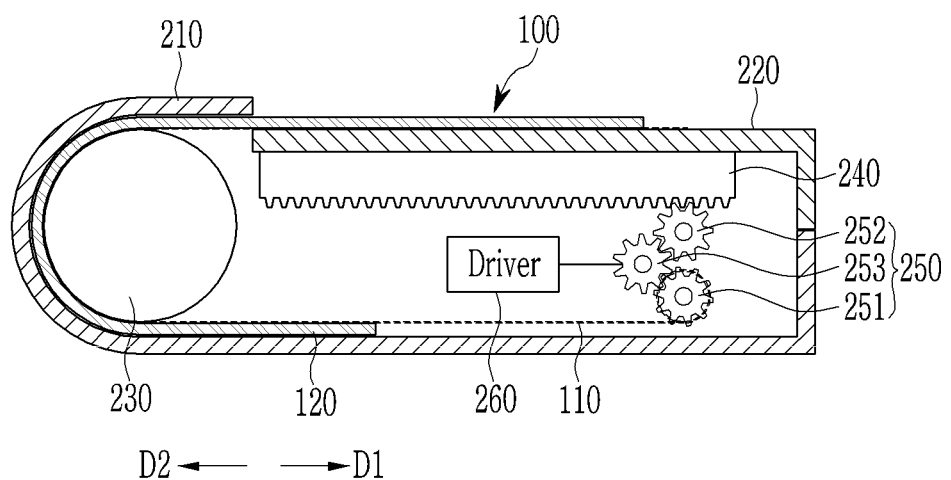
FIG. 12 is a cross-sectional view of an internal structure of an expandable display device according to some example embodiments of the present invention.

FIG. 12 is a cross-sectional view of an internal structure of an expandable display device according to some example embodiments of the present invention.

Referring to FIG. 12, a gear unit 250 includes a plurality of gears 251, 252, and 253.

Among the plurality of gears 251, 252, and 253, a first gear 251 is coupled to a second roller 255, a second gear 252 is engaged with a rail unit 240, and a third gear 253 receives a rotation force from a driver 260. The third gear 253 is engaged with the first gear 251 and the second gear 252, and the first gear 251 and the second gear 252 rotate as the third gear 253 rotates. As the second gear 252 rotates, the second housing 220 moves in a slide-extension direction D1 or a slide-retract direction D2. As the first gear 251 rotates, a display panel module 100 is rolled on or unrolled from the second roller 255.

Meanwhile, when the driver 260 is omitted and thus a user moves the second housing 220 in the slide-extension direction D1 or the slide-retract direction D2, the second gear 252 rotates in the clockwise direction or the counterclockwise direction. The third gear 253 transmits rotation of the second gear 252 to the first gear 251, and as the first gear 251 rotates, the display panel module 100 is rolled on or unrolled from the second roller 255.

Because the gear units 250 is formed of the plurality of gears 251, 252, and 253, spatial utility inside the first housing 210 can be increased, and a gear radius can be adaptively adjusted.

In FIG. 12, the gear unit 250 includes the three gears 251, 252, and 253, but the number of gears included in the gear unit 250 is not restrictive.

Excluding the differences, features of some example embodiments of the present invention described with reference to FIG. 1 to FIG. 6 can all be applied to some example embodiments of the present invention described with reference to FIG. 12, and therefore, some repetitive description will be omitted.

While aspects of some example embodiments of the present invention have been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents. Therefore, it will be appreciated by those skilled in the art that various modifications may be made and other equivalent embodiments are available. Accordingly, a true technical scope of the present invention will be defined by the technical spirit of the appended claims and their equivalents.

What is claimed is:

1. A display device comprising:
    a first roller;
    a second roller;
    a gear unit that is coupled to the second roller and configured to rotate with, and around an axis of, the second roller;
    a housing;
    a rail unit fixed to a first surface of the housing; and
    a display panel module, of which a first end is fixed to a second surface of the housing that is opposite the first surface of the housing, and a second end is fixed to the second roller and is configured to be bent by the first roller and then rolled on the second roller,
    wherein the rail unit is engaged with the gear unit and configured to move laterally across the gear unit in a direction parallel to a plane on which the display panel module is configured to be slide-extended and slide retracted as the gear unit rotates with, and around the axis of, the second roller, and
    wherein the display panel module is configured to be slide-extended and slide-retracted as the gear unit and the rail unit operate while being engaged with each other.

2. The display device of claim 1, wherein the display panel module comprises:
    a support film; and
    a display panel adhered on the support film and including a plurality of pixels.

3. The display device of claim 2, wherein tension applied to the support film while the display panel module is in a slide-extended state is higher than tension applied to the support film while the display panel module is in a slide-retracted state.

4. The display device of claim 2, wherein a portion of the display panel, exposed to the outside while the display panel module is in a slide-retracted state, is supported by the housing.

5. The display device of claim 4, wherein a portion of the display panel, not supported by the housing while the display panel module is in a slide-extended state, is supported by increased tension of the support film.

6. The display device of claim 1, wherein the rail unit and the gear unit are engaged with each other in a rack and pinion configuration.

7. The display device of claim 1, wherein the rail unit and the gear unit are engaged with each other in a chain and sprocket configuration.

8. The display device of claim 1, wherein the rail unit is formed integrally with the housing.

9. The display device of claim 1, wherein the gear unit comprises:
    a first gear coupled to the second roller;
    a second gear engaged with the rail unit; and
    a third gear engaged with the first gear and the second gear.

10. The display device of claim 1, further comprising a driver configured to provide a rotation force for rotating the second roller around a rotation axis.

11. A display device comprising:
    a first housing;
    a second housing; and
    a display panel module attached on a first surface of the second housing,
    wherein the first housing and the second housing are slide-engaged such that the display panel module is configured to be slide-extended in a slide-extension direction and slide-retracted in a slide-retract direction,
    the first housing comprises a roller configured to roll the display panel module and a gear unit coupled to the roller and thus rotates together with, and around an axis of, the roller, and
    the second housing comprises a rail unit that is fixed to a second surface of the second housing, opposite the first surface of the second housing, wherein the rail unit is engaged with the gear unit and configured to move laterally across the gear unit in a direction parallel to a plane on which the display panel module is configured to be slide-extended and slide retracted as the gear unit rotates with, and around the axis of, the roller.

12. The display device of claim 11, wherein when the second housing moves in the slide-retract direction, the gear unit and the rail unit are engaged with each other, and the display panel module is rolled on the roller by a force that moves the second housing.

13. The display device of claim 11, wherein when the second housing moves in the slide-extension direction, the gear unit and the rail unit are engaged with each other, and the display panel module is unrolled from the roller by a force that moves the second housing.

14. The display device of claim 11, further comprising a driver configured to provide a rotation force to rotate the roller around a rotation axis, wherein the second housing is configured to move in the slide-extension direction and the slide-retract direction by rotation of the roller.

15. The display device of claim 11, wherein tension applied to the display panel module while the display panel module is in a slide-extended state is higher than tension applied to the display panel module while the display panel module is in a slide-retracted state.

16. A method for moving a display device that includes a first housing and a second housing which are slide-engaged with each other, the method comprising:
    moving the second housing in a slide-extension direction for a display panel module attached on a first surface of the second housing to be slide-extended from the first housing;
    rotating a gear unit in one direction and unrolling the display panel module rolled on a roller, that is connected with the gear unit such that the gear unit rotates around an axis of the roller, from the roller as the gear unit included in the first housing and a rail unit fixed to a second surface, opposite the first surface, of the second housing are engaged with each other such that the rail unit is configured to move laterally across the gear unit in a direction parallel to a plane on which the display panel module is configured to be slide-extended and slide retracted as the gear unit rotates with, and around the axis of, the roller; and
    increasing tension applied to the display panel module as a radius of the display panel module rolled on the roller is reduced.

17. The method of the display device of claim 16, further comprising:
- moving the second housing in a slide-retract direction for the display panel module to be slide-retracted into the first housing;
- rotating the gear unit in the opposite direction and rolling the display panel module on the roller as the gear unit included in the first housing and the rail unit included in the second housing are engaged with each other; and
- releasing tension of the display panel module.

18. The method of the display device of claim 17, wherein a portion of the display panel module, exposed to the outside while the display panel module is in a slide-retracted state, is supported by the second housing.

19. A moving method of a display device that includes a first housing and a second housing that are slide-engaged with each other, the method comprising:
- rotating a gear unit included in the first housing in one direction by a driver;
- moving the second housing in a slide-extension direction to slide-expand a display panel module attached on a first surface of the second housing from the first housing as a rail unit fixed to a second surface, opposite the first surface, of the second housing is engaged with the gear unit;
- unrolling the display panel module rolled on a roller that is connected with the gear unit such that the gear unit rotates around an axis of the roller, such that the gear unit is configured to move laterally across the gear unit in a direction parallel to a plane on which the display panel module is configured to be slide-extended and slide retracted as the gear unit rotates with, and around the axis of, the roller; and
- increasing tension applied to the display panel module as a radius of the display panel module rolled on the roller is reduced.

20. The moving method of the display device of claim 19, further comprising:
- rotating, by the driver, the gear unit in the opposite direction;
- moving the second housing in a slide-retract direction for the display panel module to be slide-retracted into the first housing as the gear unit and the rail unit are engaged with each other; and
- rolling the display panel module on the roller.

\* \* \* \* \*